Patented Apr. 14, 1925.

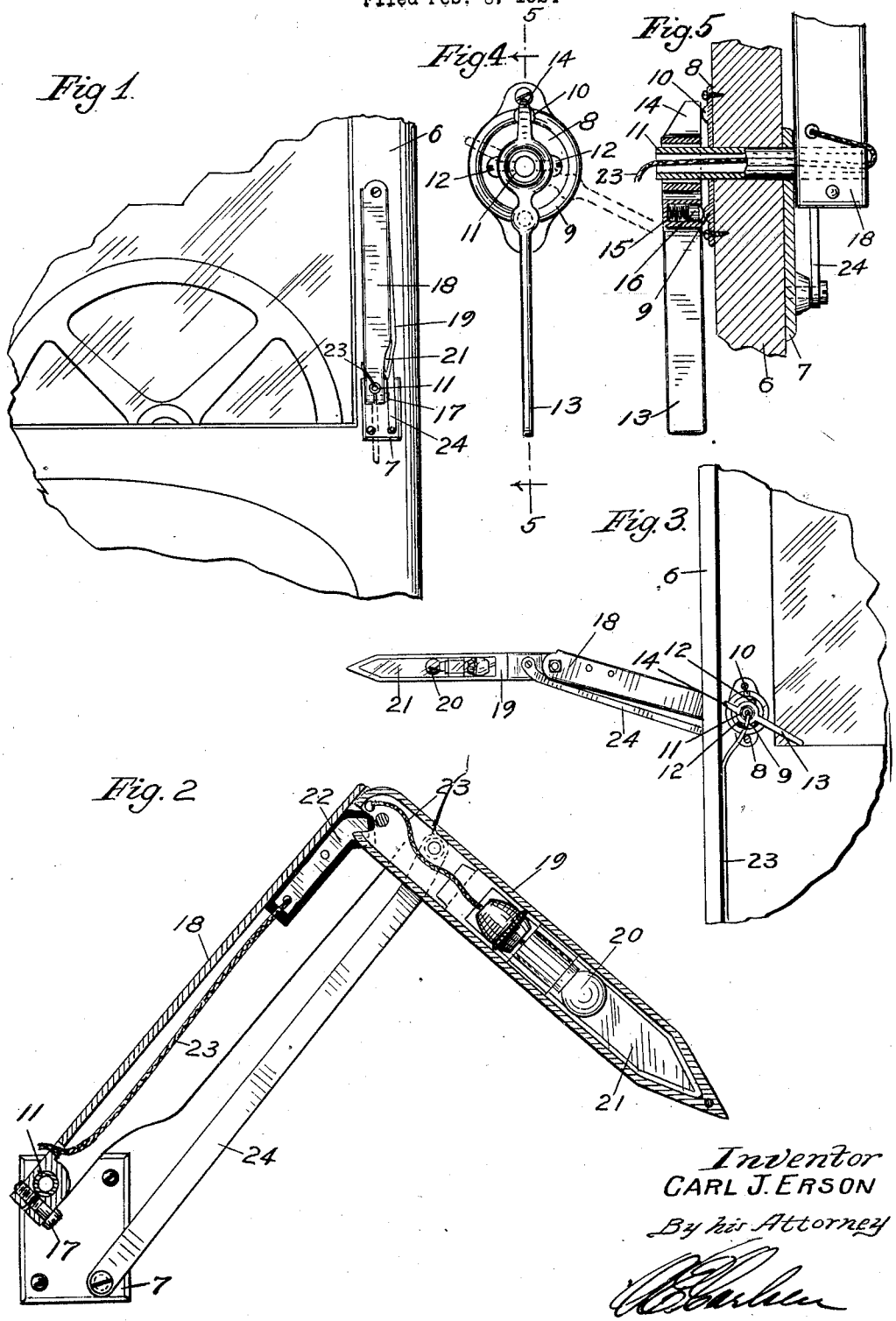

1,533,841

UNITED STATES PATENT OFFICE.

CARL J. ERSON, OF MINNEAPOLIS, MINNESOTA, ASSIGNOR OF ONE-HALF TO NILS J. VELINE, OF MINNEAPOLIS, MINNESOTA.

DIRECTION INDICATOR.

Application filed February 8, 1924. Serial No. 691,527.

*To all whom it may concern:*

Be it known that I, CARL J. ERSON, a citizen of the United States, residing at Minneapolis, in the county of Hennepin and State of Minnesota, have invented certain new and useful Improvements in Direction Indicators, of which the following is a specification.

This invention relates to direction indicators for automobiles and other vehicles, and the main object is to provide a simple, efficient, and practical device, adapted to be secured upon the vehicle, and which will indicate to other drivers and to traffic officers and pedestrians when the driver of the car is to turn at a street intersection. Further and more specific objects will be disclosed in the course of the following specification, reference being had to the accompanying drawing, wherein:

Fig. 1 is a front elevation of the left side of an automobile, of the inclosed type, showing the position of my indicator when not in active use.

Fig. 2 is an enlarged sectional elevation of the indicator, showing it as partly extended.

Fig. 3 is a rear view of the indicator, on the car, and shown as fully extended.

Fig. 4 is an enlarged detail view of the hand lever for operating the signal and as seen from the inside of the car.

Fig. 5 is a sectional elevation as seen substantially on the line 5—5 in Fig. 4.

Referring to the drawing more particularly and by reference characters 6 designates the wind shield frame of an automobile, and although this frame is shown in the present instance as a part of the automobile body, it is obvious that the indicator may, with some slight modification, also be readily applied to cars of the touring or open type.

Upon the outer side of the frame 6 I secure a plate 7, and upon the inner side I secure a plate 8, having a circular embossed rim 9 provided with a notch 10. A horizontal hollow rod or tubular member 11 extends through the frame 6 and is journaled in the plates 7 and 8. Upon the inner end of the member 11 is tiltably secured, as by screws 12, a hand lever 13, which is used to turn the rod and actuate the indicator. The short end 14 of the lever 13 is retained in frictional engagement with the rim 9 by a spring 15 which acts against a small plunger or pin 16, which rides on the rim 9 in a diametrically opposed position from the lever portion 14. The lever end 14 is normally retained in yielding engagement in the notch 10 when the indicator is in idle position, so that when the operator desires to extend the signal he presses the lever 13 slightly in before he swings it, thus releasing it from the notch.

Upon the outer end of the member 11 I rigidly secure by means of a screw 17 one end of a channel shaped casing 18. Within the outer end of this casing I pivotally secure a hollow signal arm 19, which is preferably pointed like an arrow, and is provided with a light bulb 20 which can readily be seen, when energized, through glass or celluloid windows 21. This bulb may be connected in any suitable circuit, although I prefer to arrange a switch in the circuit which will be controlled by the movement of the indicator. Thus, in Fig. 2 I show a contact spring 22 which will close the circuit between the circuit wires 23, when the arm is extended, and will open the circuit when the indicator is brought back to its idle or normal position.

The signal arm 19 is also connected, by a link bar 24, to the plate 7, and this link affects the proper movement of the arm 19 with respect to the casing 18. Thus when the casing 18 is turned to its vertical or idle position, the link 24, causes the signal arm to retract into the casing, as in Fig. 1, where it is concealed from view. And, when the casing is dropped down and out, by the lever 13, the link causes the signal arm to change to the horizontal position, as shown in Fig. 3. The link 24 is a little longer than the casing, to prevent the latter from dropping down to a full horizontal position, and is also slightly curved at its outer end so that it will not interfere with or prematurely stop against the casing when the indicator is extended, as in Fig. 3.

It is understood that although only one indicator is shown, one may be used on each side of the car if so desired. It is further understood that suitable modifications may be made in the device as herein disclosed, provided, however, that such modifications come within the spirit and scope of the appended claims. Having now therefore fully shown and described my invention, what I claim to be new and desire to protect by Letters Patent is:

1. A direction indicator consisting of a plate, a channel-shaped casing pivotally secured to said plate, a signal arm pivotally mounted in said casing so as to be substantially concealed therein when in idle position, and a link bar connected at one end to said plate and at the other end to said signal arm.

2. A direction indicator for automobiles consisting of a casing pivotally secured to the automobile to be swung outwardly therefrom, a signal arm pivotally secured to the outer end of the casing, and a link secured at one end near the base of the casing and at its other end to the signal arm so that it will swing outwardly with the casing and substantially parallel with respect thereto, said link being of different length than the casing so it will stop the outward movement of the same when the signal arm reaches a horizontal position.

3. A direction indicator for vehicles, consisting of a body member pivotally secured upon the vehicle and normally disposed in an idle vertical position above the pivot point, means for swinging the body member outwardly from the vehicle and back to normal position, a signal arm, pivotally secured at one end to the upper end of the body member, a link connection between the signal arm and the vehicle, and means to stop the outward movement of the body member when the signal arm reaches a horizontal position.

4. A direction indicator for vehicles, consisting of a body member pivotally secured at one end to the vehicle and normally disposed in a vertical position, a signal arm pivotally secured to the other end of the body member for swinging movement therefrom, a link connecting the signal arm to the vehicle, said link being longer than the body member and slightly curved at its outer end, so that it will stop the outward movement of the body member when the signal arm reaches a horizontal position.

5. A device of the character described, consisting of a plate secured upon the inner side of a vehicle and having an annular rib provided with a notch, a bearing member journaled in said plate, concentrically with respect to said rib, and extending out through the vehicle, a direction indicating device adapted to be operated by the outer end of the bearing member, a hand lever tiltably mounted upon the inner end of the bearing member, and means for yieldingly holding said lever in frictional engagement with said rib.

6. A direction indicator for vehicles, consisting of a body member pivotally secured upon the vehicle and normally disposed in an idle verticle position above the pivot point, means for swinging the body member outwardly from the vehicle and back to normal position, a signal arm pivotally secured at one end to the upper end of the body member, a link connection between the signal arm and the vehicle, and means to stop the outward movement of the body member when the signal arm reaches a horizontal position.

7. A direction indicator consisting of a plate, a channel-shaped casing pivotally secured to said plate, a signal arm pivotally mounted in said casing so as to be substantially concealed therein, when in idle position, and a link bar connected at one end to said plate and at the other end to said signal arm.

In testimony whereof I affix my signature.

CARL J. ERSON.